(12) United States Patent
Citrano, III

(10) Patent No.: US 8,364,742 B2
(45) Date of Patent: Jan. 29, 2013

(54) SYSTEM FOR VISUALIZING DESIGN AND ORGANIZATION OF WIRELESS MESH NETWORKS IN PHYSICAL SPACE

(75) Inventor: Joseph Citrano, III, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 474 days.

(21) Appl. No.: 12/394,399

(22) Filed: Feb. 27, 2009

(65) Prior Publication Data

US 2009/0265635 A1 Oct. 22, 2009

Related U.S. Application Data

(60) Provisional application No. 61/031,841, filed on Feb. 27, 2008, provisional application No. 61/031,838, filed on Feb. 27, 2008.

(51) Int. Cl.
*G06F 15/16* (2006.01)

(52) U.S. Cl. ....................................................... 709/200

(58) Field of Classification Search .................. 709/220; 370/254; 455/446
See application file for complete search history.

(56) References Cited

U.S. PATENT DOCUMENTS

| | | |
|---|---|---|
| 6,185,208 B1 | 2/2001 | Liao |
| 6,711,166 B1 | 3/2004 | Amir et al. |
| 6,826,607 B1 | 11/2004 | Gelvin et al. |
| 6,832,251 B1 | 12/2004 | Gelvin et al. |
| 6,971,063 B1 | 11/2005 | Rappaport et al. |
| 7,233,745 B2 | 6/2007 | Loechner |
| 7,246,045 B1 | 7/2007 | Rappaport et al. |
| 7,440,436 B2 * | 10/2008 | Cheng et al. ................... 370/338 |
| 7,505,734 B2 | 3/2009 | Ratiu et al. |
| 7,711,371 B2 * | 5/2010 | Basak et al. ................... 455/446 |
| 7,714,742 B1 * | 5/2010 | Noworolski et al. ............ 705/13 |
| 7,822,802 B2 * | 10/2010 | Chen et al. ..................... 709/201 |
| 2002/0065631 A1 | 5/2002 | Loechner |
| 2004/0090943 A1 | 5/2004 | da Costa et al. |
| 2004/0229623 A1 | 11/2004 | Rappaport et al. |
| 2004/0259533 A1 | 12/2004 | Nixon et al. |
| 2004/0259554 A1 | 12/2004 | Rappaport et al. |
| 2005/0074019 A1 * | 4/2005 | Handforth et al. ............. 370/406 |
| 2005/0102529 A1 | 5/2005 | Buddhikot et al. |
| 2005/0135379 A1 | 6/2005 | Callaway, Jr. et al. |
| 2005/0201349 A1 | 9/2005 | Budampati |

(Continued)

FOREIGN PATENT DOCUMENTS

| | | |
|---|---|---|
| WO | WO03023536 A1 | 3/2003 |
| WO | WO2005/050894 A2 | 6/2005 |

(Continued)

OTHER PUBLICATIONS

Acromag Incorporated, "Introduction to ProfiBus DP", ProfiBus/RS485 Network I/O Modules, Technical Reference. 2002.

(Continued)

*Primary Examiner* — Minh-Chau Nguyen
(74) *Attorney, Agent, or Firm* — Kinney & Lange, P.A.

(57) ABSTRACT

A visualization tool for displays devices included within a self-organizing mesh network with respect to the physical space occupied by the network. The visualization tool receives an image representing the physical space occupied by the wireless mesh network, scale information defining the scale of the received image, and location information defining the location of each device within the physical space occupied by the network. Based on these inputs, the visualization tool displays the layout of the wireless mesh network with respect to the physical space occupied by the wireless mesh network.

18 Claims, 10 Drawing Sheets

U.S. PATENT DOCUMENTS

| | | |
|---|---|---|
| 2005/0249137 A1 | 11/2005 | Todd et al. |
| 2005/0280555 A1* | 12/2005 | Warner, IV .................... 705/13 |
| 2005/0281215 A1 | 12/2005 | Budampati et al. |
| 2006/0002368 A1 | 1/2006 | Budampati et al. |
| 2006/0111040 A1 | 5/2006 | Jenkins et al. |
| 2006/0227729 A1 | 10/2006 | Budampati et al. |
| 2006/0229086 A1 | 10/2006 | Broad et al. |
| 2006/0256722 A1 | 11/2006 | Taha et al. |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0030816 A1 | 2/2007 | Kolavennu |
| 2007/0030832 A1 | 2/2007 | Gonia et al. |
| 2007/0071006 A1 | 3/2007 | Bosch et al. |
| 2007/0112982 A1 | 5/2007 | Sichner et al. |
| 2007/0161371 A1* | 7/2007 | Dobrowski et al. .......... 455/423 |
| 2007/0258508 A1 | 11/2007 | Werb et al. |
| 2007/0290924 A1* | 12/2007 | McCoy ........................ 342/464 |
| 2007/0297371 A1* | 12/2007 | Lea ............................... 370/334 |
| 2007/0298805 A1 | 12/2007 | Basak |
| 2008/0082698 A1* | 4/2008 | Schnaare .................... 709/250 |
| 2008/0273486 A1 | 11/2008 | Pratt et al. |
| 2008/0274766 A1 | 11/2008 | Pratt et al. |
| 2008/0278145 A1 | 11/2008 | Wenger |
| 2008/0279155 A1 | 11/2008 | Pratt, Jr. et al. |
| 2008/0279204 A1 | 11/2008 | Pratt, Jr. et al. |
| 2008/0298275 A1 | 12/2008 | De Sousa |
| 2009/0010203 A1 | 1/2009 | Pratt, Jr. et al. |
| 2009/0010204 A1 | 1/2009 | Pratt, Jr. et al. |
| 2009/0010205 A1 | 1/2009 | Pratt, Jr. et al. |
| 2009/0010233 A1 | 1/2009 | Pratt, Jr. et al. |
| 2009/0089410 A1* | 4/2009 | Vicente ........................ 709/223 |

FOREIGN PATENT DOCUMENTS

WO     WO2007146565 A2     12/2007

OTHER PUBLICATIONS

Official Search Report and Written Opinion of the Korean Intellectual Property Office in counterpart foreign Application No. PCT/US2009/035409 filed Feb. 27, 2009.

* cited by examiner

SYSTEM FOR VISUALIZING DESIGN AND ORGANIZATION OF WIRELESS MESH NETWORKS IN PHYSICAL SPACE

CROSS-REFERENCE TO RELATED APPLICATION(S)

This application claims priority to U.S. Provisional Patent Application No. 61/031,841; filed Feb. 27, 2008, and U.S. Provisional Patent Application No. 61/031,838; also filed Feb. 27, 2008, both of which are hereby incorporated by reference in their entirety.

BACKGROUND

The present invention is related to self-organizing wireless mesh networks, and in particular, to tools for orienting the mesh network in physical space.

A wireless mesh network is a communication network made up of a plurality of wireless devices (i.e., nodes) organized in a mesh topology. In a true wireless mesh network, which may also be referred to as a self-organizing multi-hop network, each device must be capable of routing messages for itself as well as other devices in the network. The concept of messages hopping from node to node through the network is beneficial because lower power RF radios can be used, and yet the mesh network can span a significant physical area delivering messages from one end to the other. High power radios are not needed in a mesh network, in contrast with point-to-point systems which employ remote devices communicating directly to a centralized base-station.

The term 'self-organizing' refers to the capability of mesh networks to form alternate paths for messaging between devices and between devices and a data collector, or a bridge or gateway to some higher-level, higher-speed data bus. Having alternate, redundant paths for wireless messages enhances data reliability by ensuring there is at least one alternate path for messages to flow even if another path gets blocked or degrades due to environmental influences or due to interference.

The paths provided from each node to a bridge or gateway are dynamic, meaning the paths can change in response to a path being blocked or a new path being added. For example, when a device node is commissioned it will generate a list of devices (i.e., neighbors) with which it can communicate. This list may be particularly dynamic the radio frequency (RF) environment and physical space occupied by the network change (e.g., a wall or metal shield is constructed between two devices limiting communication between the devices). Based on the dynamic neighbor list the device selects parent/child devices which define the communication path to/from the device to the gateway device. The list of parent/child devices is also dynamic, but typically less dynamic than the neighbor list. Because of these dynamics, the organization of the wireless mesh network is continuously changing.

One method of analyzing the operation of a mesh network is to review the organization of the mesh network based on the neighbor lists, parent-child lists, etc. provided by the network. Changes in the organization of the network are used to diagnose problems associated with the network. Prior art methods of analyzing the list include displaying each node in a diagram with lines connecting neighbors and/or parent-child pairs. However, the diagram fails to orientate the diagram in the physical space occupied by the devices making up the mesh network. As a result, effects of the physical space on the performance of the network may not be recognized.

This lack of association between the mesh network and the physical space it occupies is also evident in the design of mesh networks. Typically, designers lay out the mesh network by hand or with the aid of a computer, but without the benefit of tools for analyzing how a particular network will function in a particular physical environment.

It would be beneficial for a design/diagnostic tool to display a mesh network with respect to the physical space occupied by the network.

SUMMARY

A visualization tool displays devices included within a self-organizing mesh network with respect to the physical space occupied by the network. The visualization tool receives an image representing the physical space occupied by the wireless mesh network, scale information defining the scale of the received image, and location information defining the location of each device within the physical space occupied by the network. Based on these inputs, the visualization tool displays the layout of the wireless mesh network with respect to the physical space occupied by the wireless mesh network.

DETAILED DESCRIPTION

The present invention provides a tool for displaying devices comprising a self-organizing mesh network with respect to the physical space occupied by the network. Displaying devices with respect to the physical space occupied by the mesh network allows the effects of the physical environment to be accounted for in the design of the mesh network as well as in analysis and monitoring of the implemented network.

Figure 1:
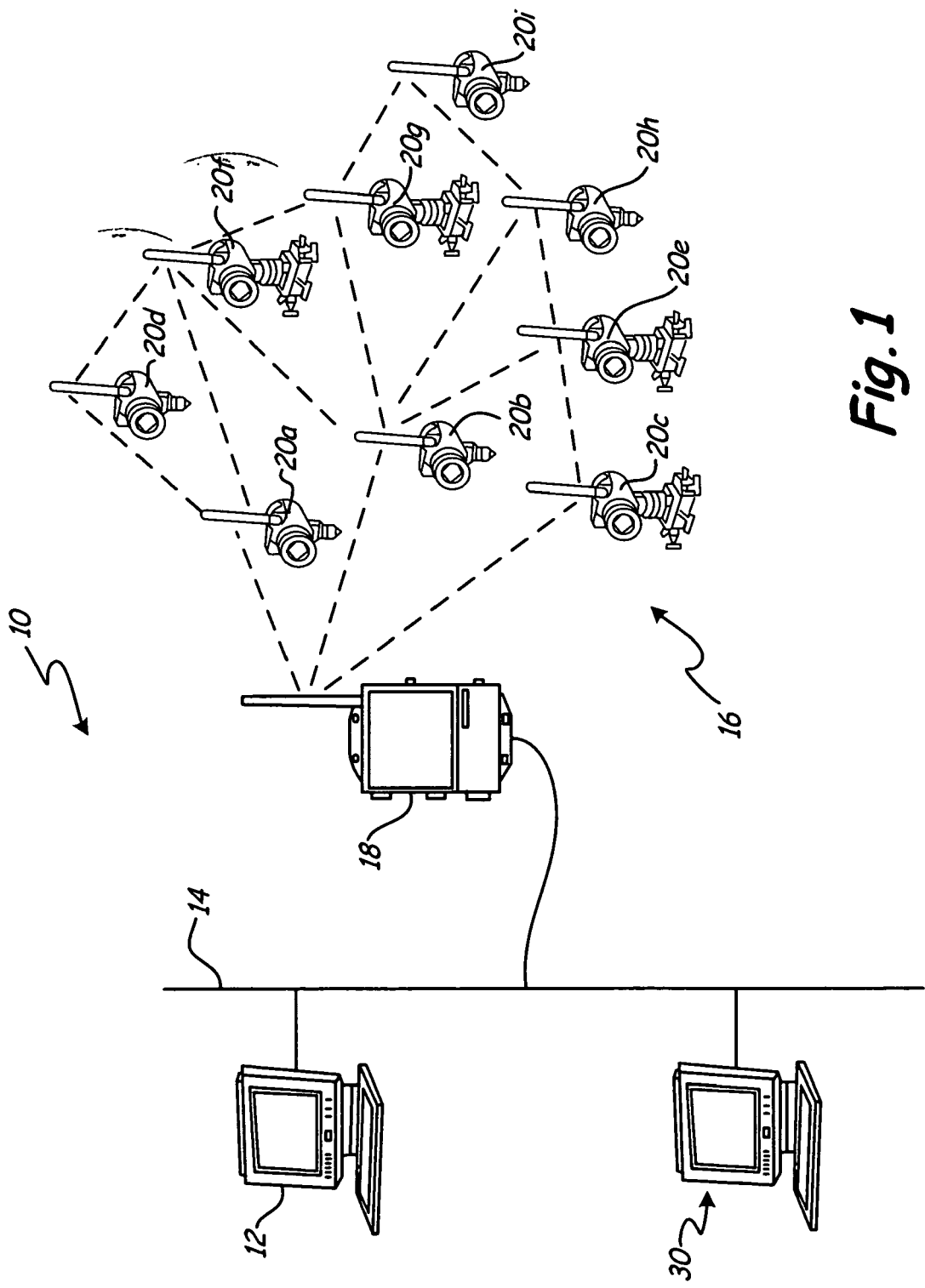
FIG. 1 is a diagram illustrating a self-organizing mesh network system in which messages are routed between a host and field devices.

FIG. 1 shows process communication system 10, which includes host computer 12, high-speed network 14, wireless mesh network 16 (which includes gateway 18 and wireless field devices or nodes 20a-20i), and network computer 30. Gateway 18 interfaces mesh network 16 with host computer 12 over high-speed network 14. Messages may be transmitted from host computer 12 to gateway 18 over network 14, and are then transmitted to a selected node of mesh network 16 over one of several different paths. Similarly, messages from individual nodes of mesh network 16 are routed through mesh network 16 from node-to-node over one of several paths until they arrive at gateway 18 and are then transmitted to host 12 over high-speed network 14.

Host computer 12 may be a distributed control system host running application programs to facilitate sending messages to field devices 20a-20i, and receiving and analyzing data contained in messages from field devices 20a-20i. Host computer 12 may use, for example, AMS™ Device Manager as an application program to allow users to monitor and interact with field devices 20a-20i.

Gateway 18 can communicate with host computer 12 over network 14 using a number of different communication protocols. In one embodiment, network 14 is an RS485 two wire communication link, on which gateway 18 may communicate with host computer 12 using the MODBUS protocol. In another embodiment, network 14 is an Ethernet network, and communication over network 14 can support MODBUS TCP/IP using an Ethernet interface.

Automated Design of Wireless Mesh Network in Physical Space

FIG. 1 illustrates a commonly employed approach to visualizing a self-organizing wireless network, in which communication between neighboring devices are illustrated by dashed lines. As changes to the neighbor list and/or parent-child list occur (i.e., as the mesh network self-organizes), the arrows between nodes change to indicate the varying relationships between device nodes. This method of visualizing self-organizing networks is commonly employed in understanding how devices communicate with one another, but does not capture or display factors associated with the physical space the devices occupy. Analysis regarding why a particular network is not working (or why a network is working) based on the graphical representation shown in FIG. 1 fails to identify factors associated with the physical space as contributing to network operation.

FIGS. 2-6B illustrate a design tool provided for the design and validation of a self-organized mesh network based on the physical space occupied by the network.

Figure 2:
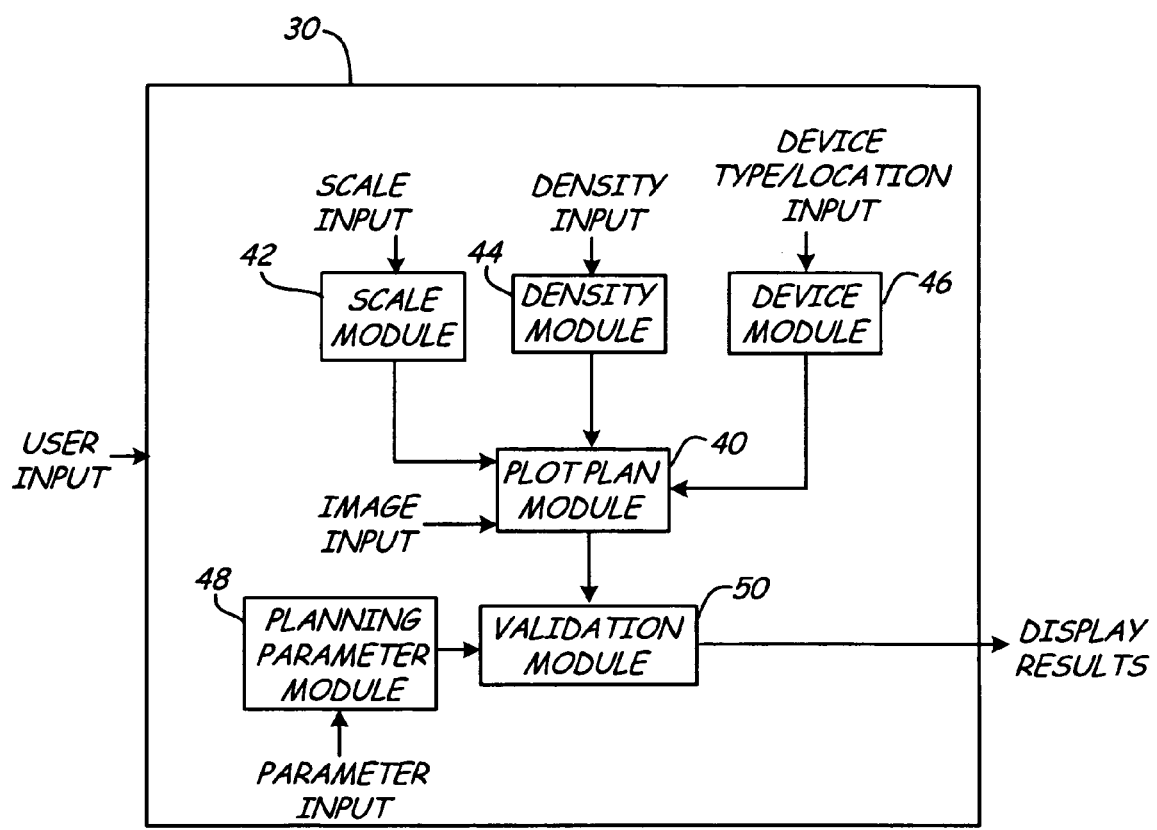
FIG. 2 is a block diagram illustrating modules employed as part of a design tool to plan and verify the design of a self-organizing mesh network system according to an embodiment of the present invention.

FIG. 2 is a block diagram illustrating one or more processor components programmed to execute software (e.g., Asset Optimization product provided by Emerson Process Management) on general purpose computer 30 according to the present invention. This programmed processor component(s) causes the general purpose computer 30 to act as a specialized tool (i.e., design tool) for implementing the functional modules described with respect to FIG. 2. The design tool allows a user to provide inputs (e.g., via an attached keyboard, mouse, etc.) and to monitor visual outputs illustrating the design of the self-organizing mesh network and the results of tests validating the operation of the proposed mesh network layout.

The functional design tool modules include plot plan module 40, scale module 42, density module 44, device module 46, planning parameter module 48 and validation module 50. The modules represent functional aspects provided by the design tool, including outputs provided by each module, to assist in the design and validation of mesh networks. Functions performed by each module are described with respect to FIGS. 3-6B, which are screen shots illustrating the inputs provided by a user and the output provided by the design tool.

In the embodiment described below, general purpose computer 30 is connected to a network that allows communication with gateway 18. As discussed below with respect to overlaying the implemented mesh network onto physical space and analyzing communication on the mesh network, it may be beneficial for general purpose computer 30 to be connected to receive information from gateway 18. However, during the design stage it is not necessary that computer 30 be connected to communicate with gateway 18 (or network 14, for that matter).

Plot plan module 40 provides prompts, in response to a user request, for a user to select an image representative of the physical space occupied by the mesh network. The representation of physical space imported by the user (i.e., the image) may be of any type (e.g., bitmap, JPEG, portable document format (PDF), AutoCAD drawing files, etc.) capable of being displayed by the general purpose computer. For example, the image imported by the user may be an aerial photograph, a screenshot from Google Maps, or a diagram representing the physical space occupied by the mesh network. The image or rendering may be represented in either two-dimensional space or three-dimensional space.

Having selected an image, the user is able to select and provide input via scale module 42, density module 44, and device module 46 to define aspects of the selected physical space and define the layout of the mesh network occupying the physical space. Scale module 42 is connected to receive user input that allows the design tool to associate a particular scale to the image representing the physical space occupied by the mesh network. Communication between device nodes is largely dependent on the distance between devices. As such, proper scaling of the physical space is important for accurate estimates of the communication capabilities between devices placed on the physical space as part of the proposed mesh network layout. The defined scale is associated with the physical space defined and displayed by plot plan module 40.

Density module 44 receives input from a user allowing the user to associate various 'density' levels with the physical space or with particular regions associated with the physical space. Density refers to those physical factors that may impede the ability of devices to communication with one another. Assigning various density levels to the physical space allows the design tool to simulate the effect various environments will have on the communication capabilities of the mesh network.

Device module 46 also receives input from a user allowing the user to place at specific locations within the physical space defined by plot plan module 40 various device nodes making up the proposed mesh network layout. Device module 46 allows a user to select from various types of devices, and to selectively place them within the defined physical space.

Planning parameters module 48 receives input from a user (although it does not necessarily need to receive user input) defining those parameters that will be used to assess the validity of the proposed mesh network design. A user may vary the planning parameters based on the application or on the desired reliability associated with the mesh network.

Based on the physical space defined by the plot plan module (including the scale, density, and location of devices within the defined physical space) and the planning parameters provided by planning parameters module 48, validation module 50 determines whether the proposed mesh network layout satisfies the requirements and displays the result to the user.

The design tool is discussed in more detail with respect to the screenshots provided in FIGS. 3-6B. The screenshots are based on examples generated using the Asset Optimization product provided by Emerson Process Management.

Figure 3:
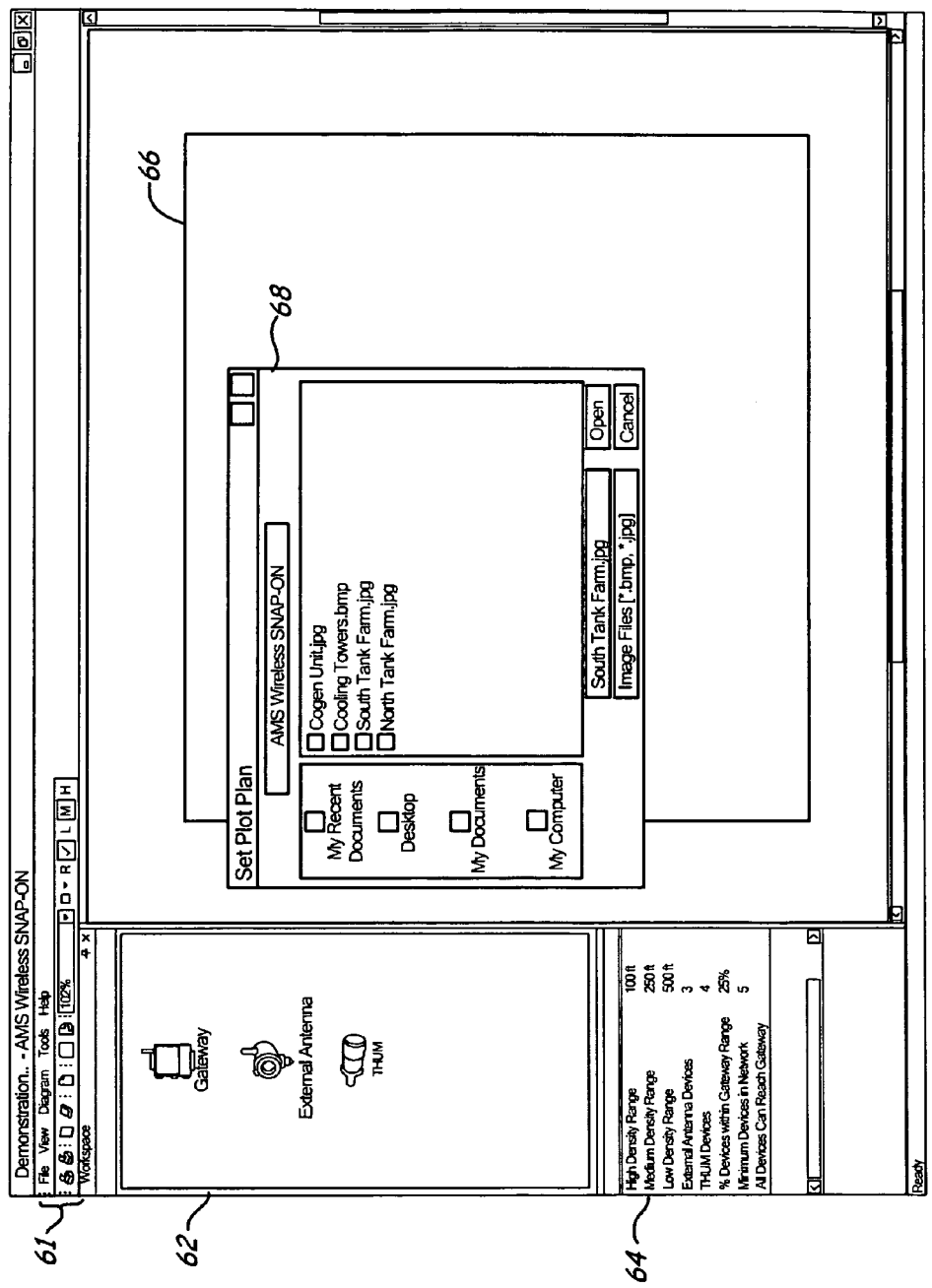
FIG. 3 is a screenshot of the design tool illustrating the importation of an image representing the physical space occupied by the mesh network according to an embodiment of the present invention.

FIG. 3 is a screenshot illustrating display 60 provided by the design tool. Display 60 provided by the design tool provides an interface for a user to interact with the design tool, and includes toolbar 61, device workspace window 62, planning parameters window 64, and plot plan window 66. These windows are included within each screen shot provided, although a user may elect to remove, hide, or rearrange these windows as desired. Workspace window 62 displays devices, including a gateway device, external antenna device, and THUM devices ('the HART updated module') having an internal antenna device, that can be selectively dragged and dropped onto the image provided in plot plan window 66. Planning parameters window 64 represents the design requirements that will be imposed on the mesh network. As discussed in more detail below, these parameters are used to validate the proposed mesh network. Plot plan window 66 is used to display the image representative of the physical space occupied by the mesh network.

As discussed with respect to FIG. 2, plot plan module 40 receives an image provided by the user and displays the selected image in plot plan window 66. In response to a user request (requested through the 'tools' button located on toolbar 61) to import an image, 'Set Plot Plan' window 68 is displayed, prompting a user to select a particular image file to import. In this example, a user selects the image file labeled 'South Tank Farm.jpg', a JPEG file that illustrates the physical space in which the mesh network will operate.

Figure 4A:
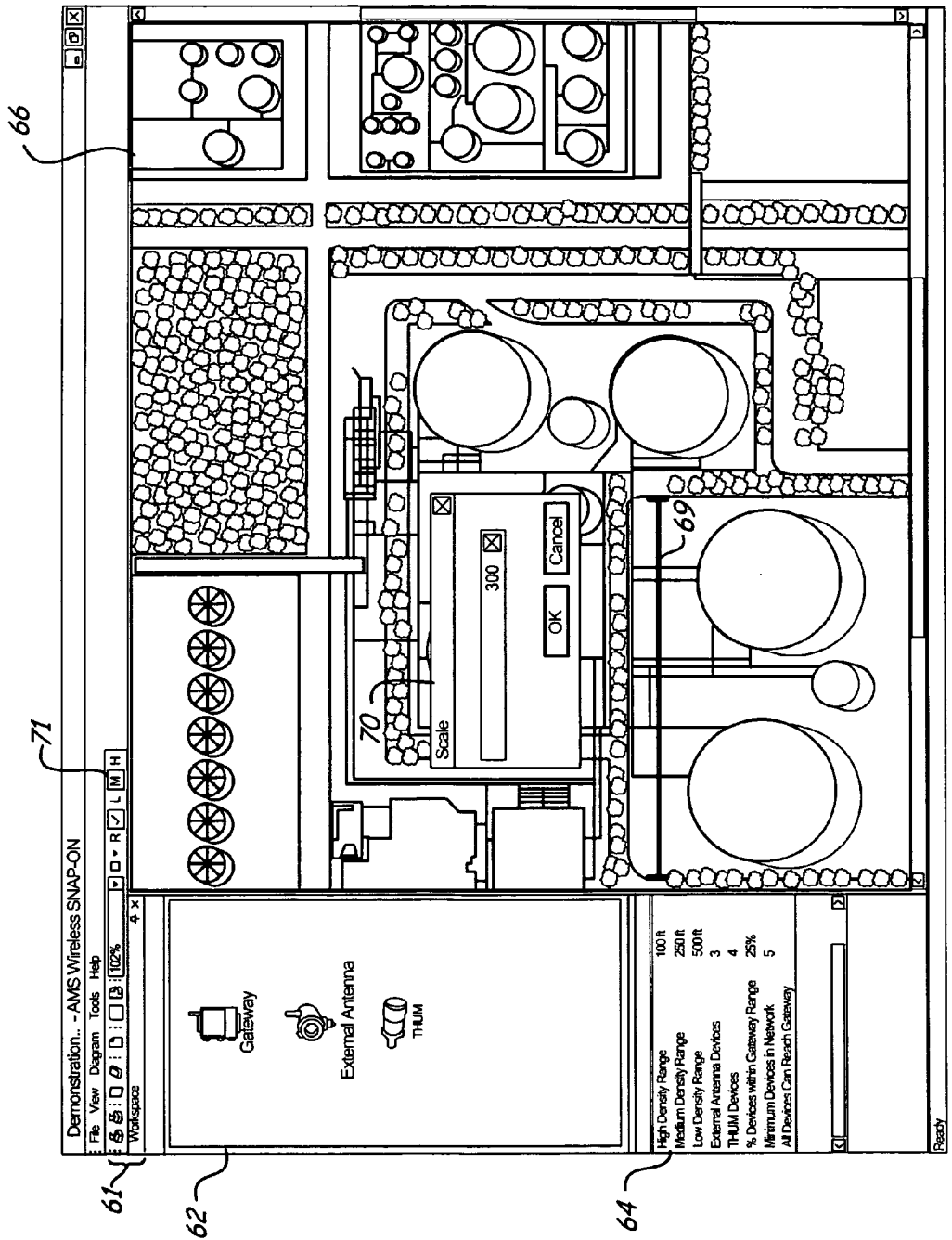
FIGS. 4A and 4B are screenshots of the design tool illustrating the assignment of scale to the image representing the physical space occupied by the mesh network according to an embodiment of the present invention.
Figure 4B:
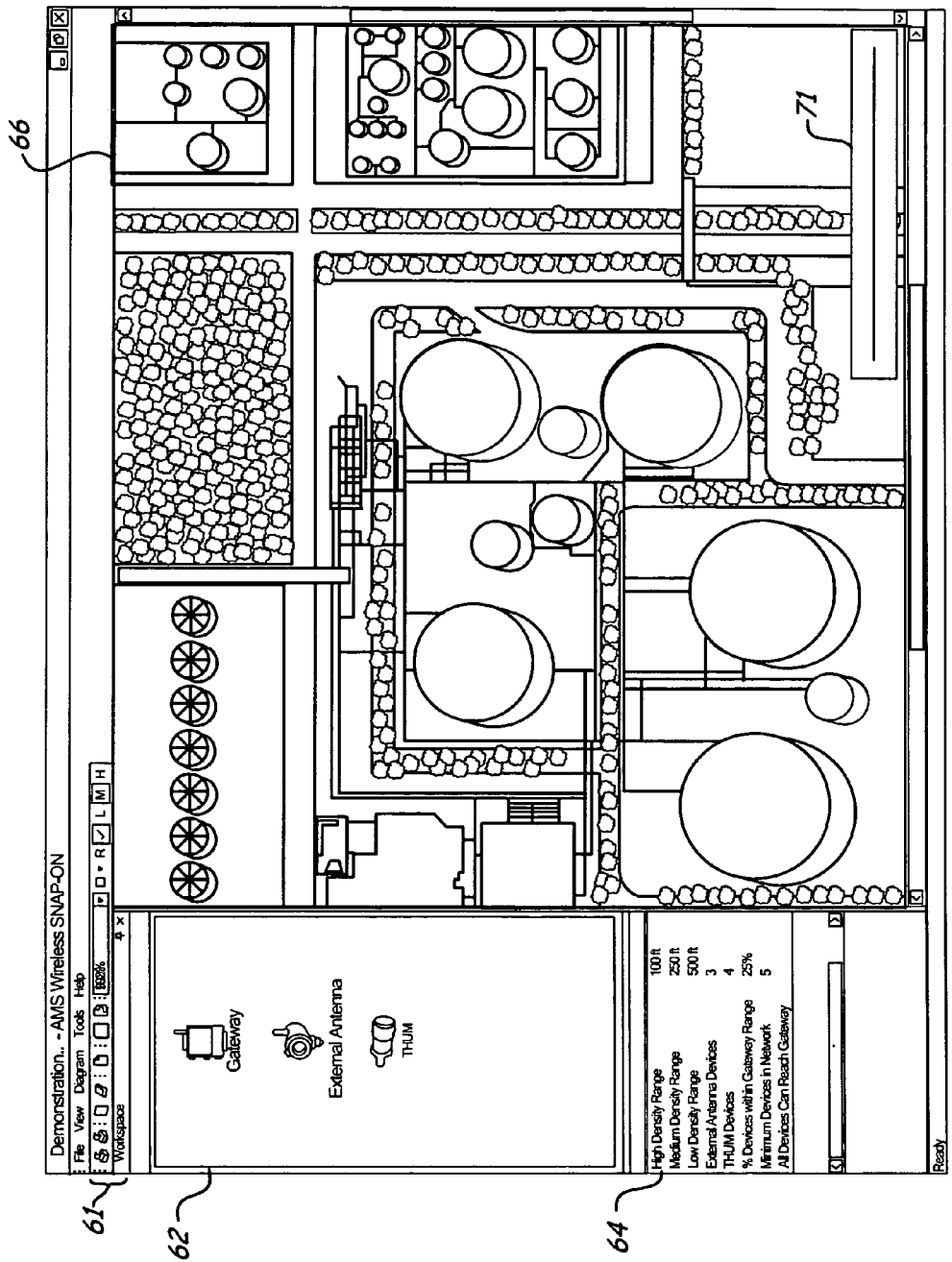

FIGS. 4A and 4B are screenshots illustrating the selection of scale. In response to a user request to assign scale (selected through the 'tools' button on toolbar 61), the design tool opens scale line 69 and scale window 70. The user is allowed to manipulate scale line 69 to extend between two points a known distance apart from one another. In the example shown in FIG. 4A, the user manipulates line 69 to extend between two walls known to be 300 feet apart. The user enters into scale window 70 the distance represented by the length of line 69, and from this value, the design tool (i.e., scale module 40) assigns a scale to the image representing the physical space occupied by the mesh network. In the example shown in FIG. 4B, based on the value assigned to line 69, the design tool associates a scale (scale 71) with the physical space occupied by the mesh network.

In addition, FIGS. 4A and 4B illustrate the designation of density with a region or regions of the physical space occupied by the mesh network. As described above, density refers to those physical factors that may impede the ability of devices to communication with one another. In the example shown in FIGS. 4A and 4B, a user is allowed to select between three density levels; low, medium and high. A low density level would be assigned to outdoor applications, such as oil and gas wells, tank farms (where devices are mounted on top of the tanks), and open areas where a majority of points are visible from the gateway, or indoor applications with few obstructions, where devices are in the same room or separated by drywall. Medium density levels would be assigned to indoor or outdoor applications containing equipment, tanks and piping, or other obstructions, with many of the devices visible from the gateway, with the devices being located on the same floor or mainly in the same room as the gateway. High density levels would be assigned to indoor or outdoor applications where many device nodes are not visible from other device nodes because of obstructing equipment, tanks, and piping in the area. In addition, this would apply if devices would be located in separate rooms or on different floors, wherein there are many obstructions, both permanent and temporary between the signals.

Low density regions represent regions in which wireless signals will propagate relatively unimpeded between devices, medium density regions will encounter moderate impedance of the wireless signal, and high density regions will encounter high impedance of wireless signals. Devices located in high density regions will therefore need to be located in closer proximity than devices located in medium density or low density regions.

In the example illustrated in FIGS. 4A and 4B, the entire region is designated as a medium density region, as indicated by the box located around the 'M' on density selection box 72. In other embodiments, selected sub-regions within the image may be selected and assigned individual densities associated with the particular physical attributes of each region. The selected density determines the parameters to be applied to each region. For example, planning parameter window 64 assigns maximum communication ranges to each density range, the ranges representing the maximum distance allowed for devices to be considered neighbors. In this example, high density regions are assigned a maximum distance of 100 ft., medium density regions are assigned a maximum distance of 250 ft., and low density regions are assigned a maximum distance of 500 ft.

Figure 5:
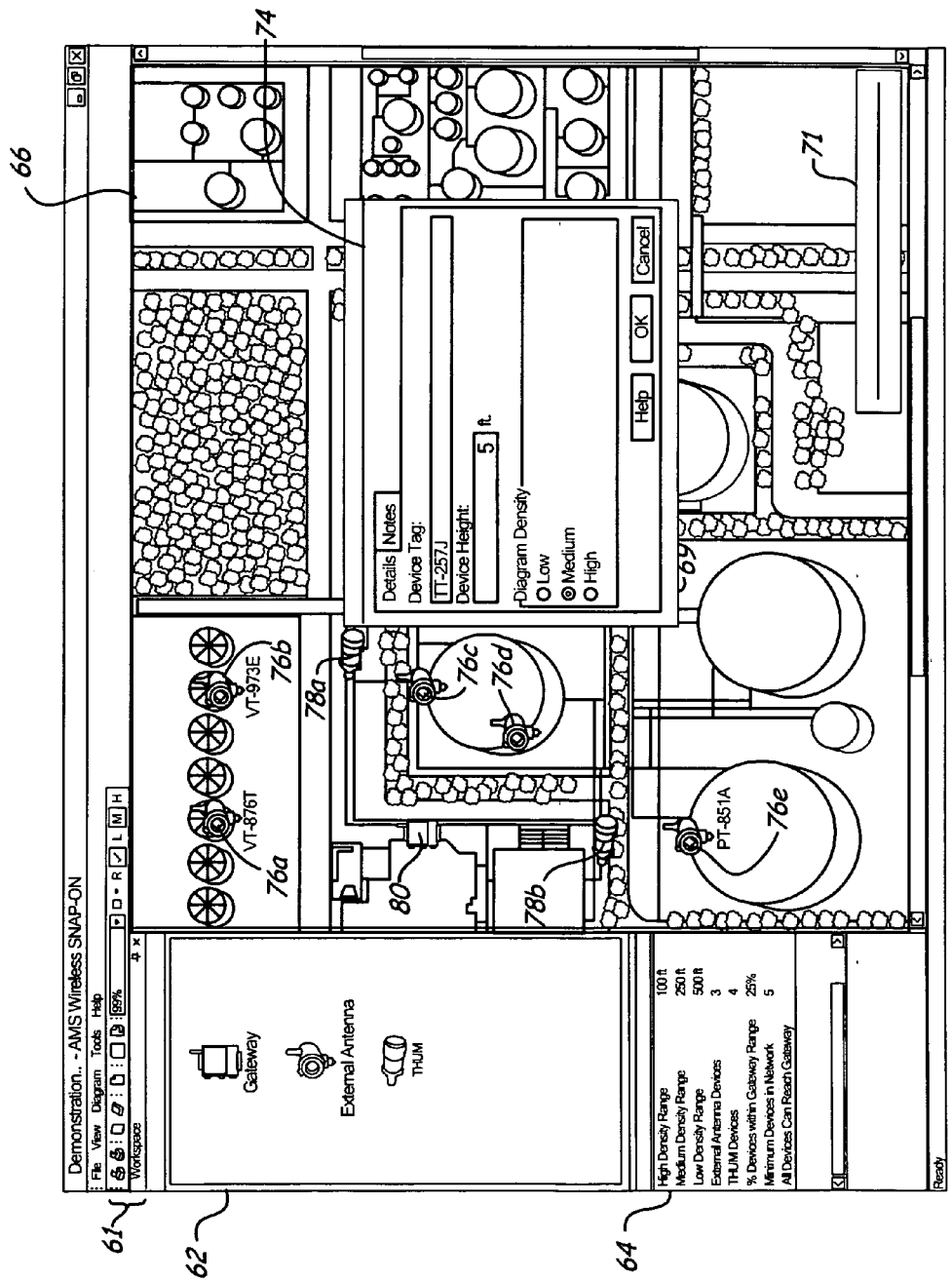
FIG. 5 is a screenshot of the design tool illustrating the placement of device locations into the image representing physical space occupied by the mesh network according to an embodiment of the present invention.

FIG. 5 is a screenshot illustrating the placement of devices onto the representation of physical space according to an embodiment of the present invention. Workspace window 62 represents the various classes of devices (gateway devices 75, external antenna devices 76, and THUM devices 78) that may be selectively dragged and dropped onto the image representing the physical space occupied by the mesh network. In the example illustrated in FIG. 5, a gateway device 80, five external antenna devices 76a, 76b, 76c, 76d and 76e, and two 'the upgraded HART modules' (THUM) devices 78a and 78b are selectively placed within the image representing the occupied physical space. These devices represent the proposed mesh network layout to be validated by the design tool.

Each time a device is dragged and dropped onto the image representing the physical space, 'New Device' window 74 prompts the user for additional information about the device, including a device tag (e.g., identifier such as name, address, etc.) and the height of the device. The device tag allows the device to be uniquely identified during implementation and analysis of the layout in the field. The device height is relevant because communication between neighboring devices is highly dependent on the distance between devices. If one device is located at the top of a 250 ft. tower and another device is located at the bottom of the tower, without height information the locations of the devices may be misinterpreted by the design tool as relatively close to one another.

In the example provided in FIG. 5, external antenna device 76c (generically labeled 'External Antenna Device 1') is dragged and dropped at a specific location within the physical space occupied by the mesh network. New device window 74 is employed by a user to assign a device tag (labeled 'TT-257J') and a height (e.g., 5 ft.) to the device.

Figure 6A:
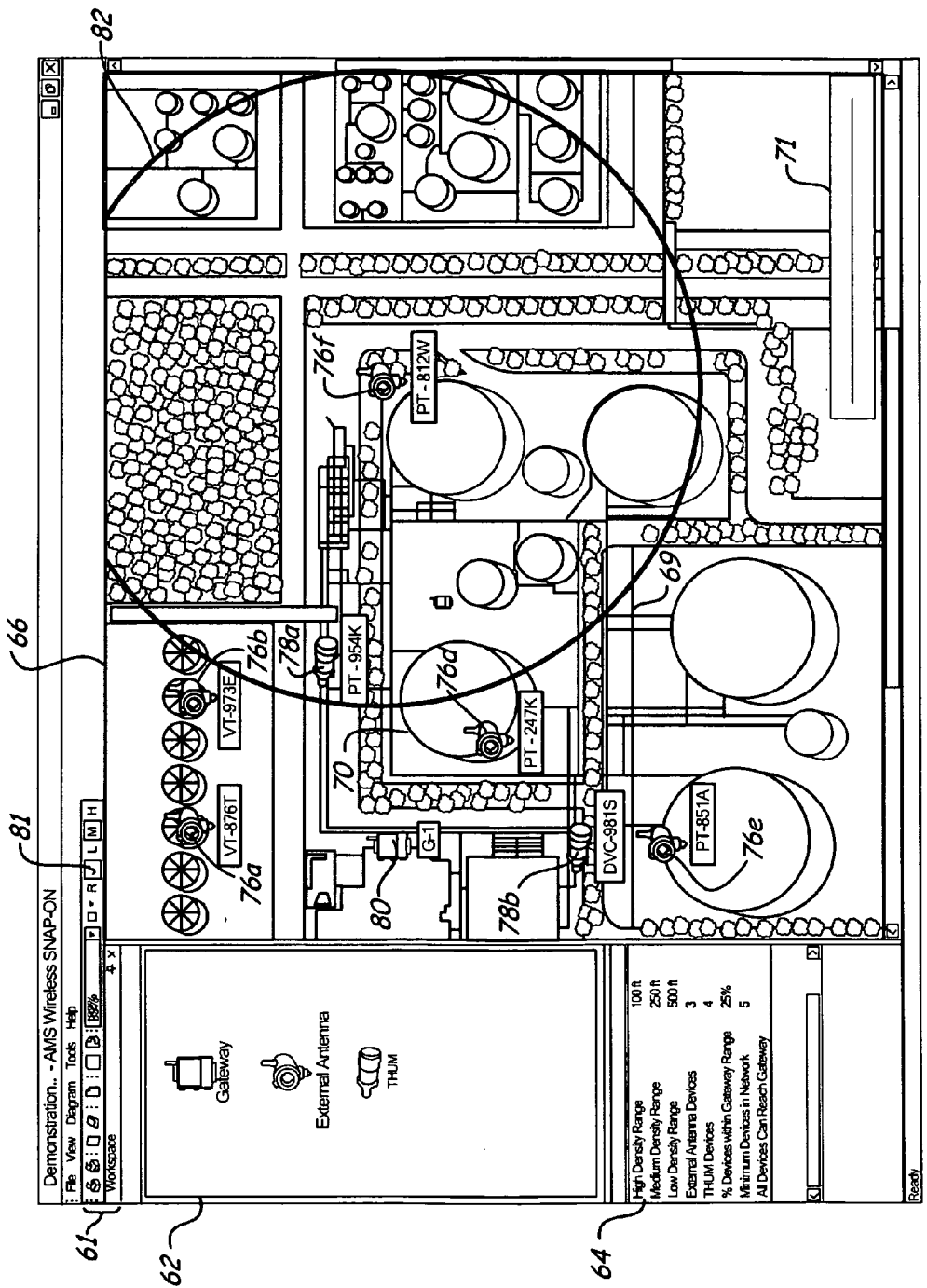
FIGS. 6A and 6B are screenshots of the design tool illustrating the validation of the mesh network based on the layout provided by the user according to an embodiment of the present invention.
Figure 6B:
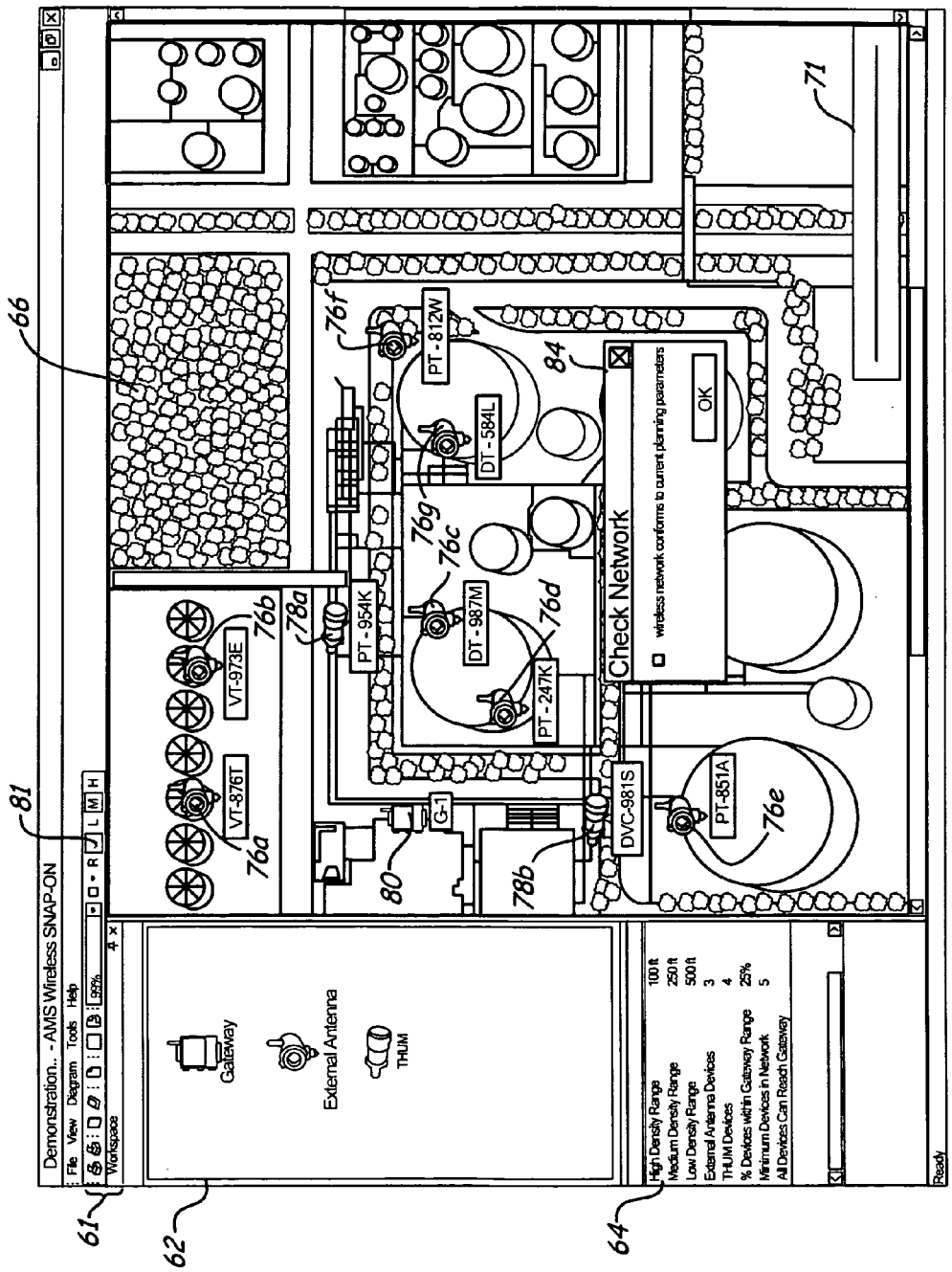

FIGS. 6A and 6B illustrate the validation of the proposed mesh network layout. Based on inputs provided by the user, including the scale associated with the physical space, the density (or densities) associated with the physical space, and the type and location of device placed onto the physical space, the design tool (i.e., validation module 50) determines whether the proposed mesh network will meet the planning parameters defined in planning parameter window 64. In the example provided in FIG. 6A, the planning parameters include 'High Density Range', 'Medium Density Range', 'Low Density Range', 'External Antenna Devices', 'THUM Devices', '% of Devices within Gateway Range', 'Minimum Devices in Network', and 'All Devices Can Reach Gateway'. The low, medium and high density ranges define the maximum communication ranges of devices based on the physical environment in which the device is operating. As discussed above, a high density designation requires device to be closer to one another to ensure reliable communication. In the example shown in FIG. 6A, the entire region is defined as medium density. As a result, devices are required to be within 250 ft. of each other to qualify as neighbors.

The 'External Antenna Device' parameter dictates the number of devices that must be within communicating range of each external antenna device (labeled 76a, 76b, 76d, 76e, and 76f). In this example, the parameter indicates that at least three devices must be within communicating distance of each external antenna device. The 'THUM device' parameter dictates the number of devices that must be within communicating range of each THUM device (labeled 78a and 78b). In this example, the parameter indicates that at least four devices must be within communicating distance of each THUM device.

The '% of Devices Within Gateway Range' parameter dictates the percentage of devices (relative to the total number of devices) that must be within communicating range of the gateway device (labeled 80). In this example, this parameter dictates that 25% of all devices must be located within communication range of gateway device 80.

Each of these parameters may be modified by the user. To provide a layout with higher reliability, the parameters may be tightened (i.e., made more stringent). Conversely, a layout with lower reliability requirements may allow a user to loosen the parameters. In another embodiment, a reliability requirement may be selected by a user (e.g., by way of a sliding bar, or quantitative field). Parameters are selected automatically by the design tool based on the desired reliability level requested by the user.

To initiate a validation test of the proposed mesh network, a user clicks on the check button 81 located on toolbar 61. The design tool, based on the input provided by the user regarding the scale of the physical space, the location of the devices within the physical space, description of the density associated with the physical space, and parameter values provided by the user, analyzes the mesh network to determine whether it complies with the stated parameters. In the event that the network does not comply with one or more of the parameters, the design tool indicates the planning parameter that was violated as well as the device that was responsible for the violation (if a single device can be identified). In the example provided in FIG. 6A, the planning parameter requiring each external antenna device to be located within communication range of three devices was violated as indicated by the highlighting of this parameter within planning parameter window 64. In addition, the external antenna device 76f responsible for the violation is identified, and circle 82 is drawn around the device to highlight the effective communication range of external antenna device 76f and the lack of sufficient devices within this communication range as required by the violated planning parameter.

If the proposed layout fails the validation test, the user is prompted to correct the layout by adding additional device nodes to the layout. Having added additional devices within the communication range of external antenna device 76f (as illustrated in FIG. 6B by the addition of external antenna devices 76g and 76c), the validation test is run again. Assuming the proposed layout passes the validation, check network window 84 provides an indication to the user that the proposed design has passed the validation test.

In this way, the present invention provides a design tool that allows a user to define the mesh network with respect to the physical space occupied by the mesh network and validate the defined network.

Overlaying a Wireless Mesh Network onto Physical Space

Analysis of self-organizing mesh networks typically involves reviewing connection lists maintained by the gateway indicating which devices are identified as neighbors, parent-child, etc. Changes in these lists are indicative of changes to the network or the physical space occupied by the network and can be used to diagnose problems within the network. Prior art methods provided visual outputs displaying communication between devices, but failed to relate the devices to the physical space occupied by the network or relate the locations of each device relative to other devices. Without information relating the diagram of communication paths between devices to the physical space occupied by each device, detecting problems within the network associated with changes to the physical space were difficult to diagnose. The present invention overcomes these limitations by overlaying the wireless mesh network onto the physical space occupied by the network.

The design tool described with respect to FIGS. 2-6B, an embodiment of which was described with respect to screenshots generated using the Asset Optimization product provided by Emerson Process Management, may be operated as a diagnostic tool. In that mode of operation, some modules described with respect to FIG. 2 are not employed, while other new modules are employed by the diagnostic tool that were not employed by the design tool.

Figure 7:
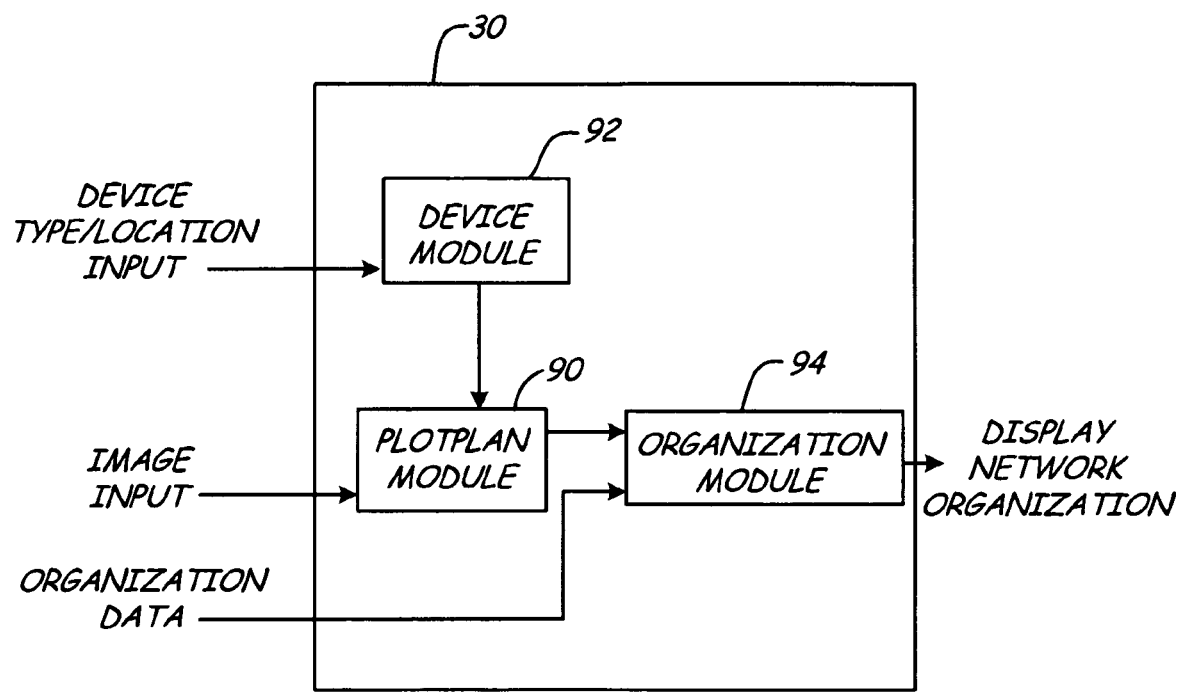
FIG. 7 is a block diagram illustrating modules employed as part of a diagnostic tool used to monitor a self-organizing mesh network system according to an embodiment of the present invention.

FIG. 7 is block diagram illustrating one or more processor components programmed to execute software (e.g., Asset Optimization product provided by Emerson Process Management) on general purpose computer 30 (as shown in FIG. 1) according to the present invention. This programmed processor component(s) causes the general purpose computer to act as a specialized tool (i.e., diagnostic tool) for implementing the functional modules described with respect to FIG. 7. The diagnostic tool allows a user to provide inputs (e.g., via an attached keyboard, mouse, etc.) and to monitor visual outputs illustrating the organization of the self-organizing mesh network. In addition, general purpose computer 30 may be located remotely (e.g., in a control room) with respect to gateway 18, or may be connected directly to gateway 18 (e.g., a laptop could be connected to a gateway located in an area without much infrastructure) to retrieve information regarding the organization of the network.

These modules include plot plan module 90, device module 92 and organization module 94. The modules represent functional aspects provided by the diagnostic tool, including outputs provided by each module to assist in the diagnostics associated with the mesh network being monitored. In this embodiment, general purpose computer 30 is connected to a network that allows communication with gateway 18 (or network manager, either residing on gateway 18 or residing separately on a computer, server, or other part of the control system) to receive information regarding the status of the mesh network.

Plot plan module 90 operates in much the same way as plot plan module 40 described with respect to FIG. 2, in which the module receives image input representing the physical space occupied by the mesh network being analyzed. Device module 90 allows a user to selectively place devices within the physical space occupied by the mesh network, thereby relating the devices to the physical space occupied by the mesh network and the location of the devices relative to one another. For diagnostic purposes, it is important that the devices placed onto the image representative of the physical space correlate with the actual locations of the devices employed by the mesh network. It addition, it is also important for the devices provided by device module 92 onto the physical space to be identified in a way that allows organization data provided by gateway 18 (representing communication between actual devices) to be associated with the correct device in the layout provided by plot plan module 90.

In other embodiments, overlaying the devices included within the mesh network over the physical space occupied by the mesh network is done automatically by importing the layout designed with the design tool (assuming the proposed layout correlates well with the implemented layout of the mesh network). The imported layout once again relates the devices to the physical space occupied by the mesh network and the location of the devices relative to one another.

Organization module 94 receives organization data provided by gateway 18 regarding the configuration of the mesh network. This information may include actual wireless communications received by gateway 18, lists maintained by gateway 18 (or maintained independently by each device) identifying parent-child relationships between devices in the mesh network, lists identifying neighbor relationships between devices in the mesh network, and information regarding the stability of various paths between device in the mesh network.

Based on the communication information provided by gateway 18 and the layout of the wireless mesh network defined with respect to the space occupied by the mesh network, organization module generates an output describing the present organization of the mesh network. The benefit of automatically overlaying information regarding the organization of the mesh network over the physical space occupied by the mesh network is it allows technicians/operators to more easily assess whether changes in the network organization (whether positive or negative) are attributable to the physical space the devices occupy. For example, if communication with a particular device is lost each day at approximately the same time, a technician may look for daily changes to the environment (e.g., a truck moving metal rolls through the factory at the same time each day) that may be responsible for the loss of communication. In addition, the automatic display of the organization of the mesh network over the physical space occupied by the network allows a user to analyze ways to optimize the network, evaluate whether the mesh network will remain reliable in response to a change in the physical environment (e.g., construction of a wall between neighboring devices), and evaluate the consequences to the network as a whole if one or more device nodes are lost. In this way, the tool is not only diagnostic in the sense that it allows a user to prognosticate as well.

In one embodiment, the diagnostic tool receives and stores organization data at regular intervals from gateway 18. Organization data may include data regarding the organization of the mesh network and network statistics (e.g., RSSI values, path stability, latency, etc.) associated with the network.

The stored organization data can be used for forensic purposes to determine why a particular portion of the network failed at a particular time, or can be used to detect trends in the organization of the network. In another embodiment, gateway 18 stores organization data over a period of time at regular intervals. In response to a request from the diagnostic tool, the gateway 18 communicates the stored organization data to the diagnostic tool for analysis.

Figure 8:
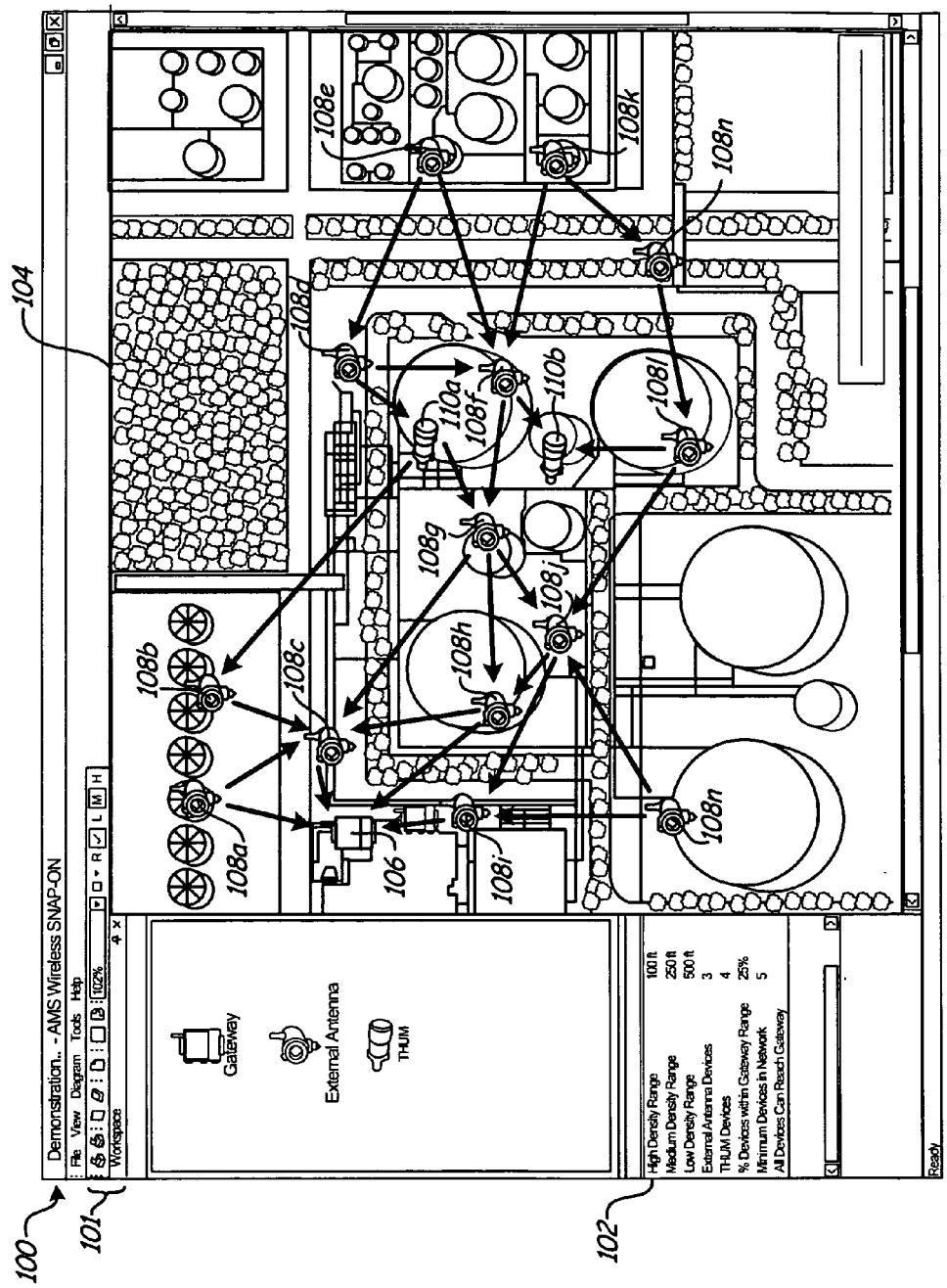
FIG. 8 is a screenshot illustrating the display of the organization of the mesh network over the physical space occupied by the network.

FIG. 8 is a screenshot illustrating the display provided by the diagnostic tool, which overlays the organization of the mesh network on the physical space occupied by the network. In this example, display 100 includes toolbar 101, planning parameters window 102, and plot plan window 104. Devices provided in the display include gateway device 106, external antenna devices 108a-108n located at various locations within the defined physical space, and THUMs 110a and 110b. Organization data provided by gateway 18 is used to determine the present organization of the mesh network. Based on the organization data, the diagnostic tool automatically generates the arrows identifying (in this particular display) parent-child relationships defining available paths for a message to travel from each device to gateway 106. In other embodiments, the lines connecting devices may represent devices qualifying as neighbors or actual communications between devices. In this way, the diagnostic tool automatically provides the user with a visual display of the organization of the mesh network, provided with respect to the physical space occupied by the mesh network.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A computer-implemented visualization tool for establishing a correlation between a wireless mesh network comprised of a plurality of devices and physical space occupied by the wireless mesh network, the visualization tool stored on a non-transitory computer-readable medium executed by a processor to implement modules of the visualization tool, the visualization tool comprising:
   a plot plan module that receives as input an image representing the physical space occupied by the wireless mesh network and displays the image to a user;
   a scale module that receives input from a user representing a scale associated with the physical space defined by the received image, wherein the scale is associated with the physical space defined by the plot plan module;
   a device module that displays one or more devices and receives input indicating placement of each device within the image representing the physical space occupied by the wireless mesh network, the locations dictating a layout of the wireless mesh network with respect to the physical space occupied by the network; and
   a display module that displays the layout of the wireless mesh network with respect to the physical space occupied by the wireless mesh network.

2. The computer-implemented visualization tool of claim 1, further including:
   a planning parameter module that defines one or more planning parameters, each planning parameter defining a requirement that must be met by the layout of the wireless mesh network; and
   a validation module that determines based on the scale associated with the physical space and the placement of devices onto the physical space whether the wireless mesh network layout complies with each of the planning parameters, wherein the validation module provides a visual output indicating whether the layout complies with the planning parameters.

3. The computer-implemented visualization tool of claim 2, wherein the visual output provided by the validation module indicating that the layout does not comply with the planning parameters highlights each device failing to satisfy one or more of the planning parameters by displaying a circle indicating the communication range of the device and displaying the planning parameter that the device failed to satisfy.

4. The computer-implemented visualization tool of claim 2, further including:
a density module that receives input from a user associating density levels with the physical space defined by the received image, wherein the validation module further determines based on the density levels associated with the physical space whether the wireless mesh network layout complies with each of the planning parameters.

5. The computer-implemented visualization tool of claim 1, further including:
an input connected to receive organization data provided by a gateway device connected to communicate with the wireless mesh network; and
an organization module that automatically displays organization data provided by the gateway device onto the image representing the physical space occupied by the actual wireless mesh network, wherein displayed organization data represents the present organization of the mesh network as it relates to the physical space occupied by the mesh network.

6. The computer-implemented visualization tool of claim 5, wherein the organization data provided by the gateway device to the visualization tool includes at least one of the following: actual communications between devices associated with the mesh network, a current list of parent-child relationships associated with devices on the mesh network, a neighbor list defining each neighbor associated with devices on the mesh network, or path stability between devices on the mesh network.

7. A computer-implemented diagnostic tool for automatically overlaying organization of a self-organizing wireless mesh network with respect to physical space occupied by the network, the diagnostic tool stored on a non-transitory computer-readable medium executed by a processor to implement the modules of the diagnostic tool, the diagnostic tool comprising:
an input connected to receive organization data provided by a network manager connected to communicate with one or more wireless mesh networks, each comprised of a plurality of devices;
a plot plan module that receives as input an image representing the physical space occupied by the one or more wireless mesh networks and displays the received image to a user;
a device module that receives input identifying the location of each device within the physical space occupied by the one or more wireless mesh networks and overlays the location of each of the plurality of devices on the display provided to the user; and
an organization module that automatically displays organization data provided by the network manager onto the image representing the physical space occupied by the one or more wireless mesh networks, wherein organization data represents the present organization of the mesh networks as they relate to the physical space occupied by the mesh network.

8. The computer-implemented diagnostic tool of claim 7, wherein the organization data provided by the network manager to the diagnostic tool includes at least one of the following: actual communications between devices associated with the mesh network, a current list of parent-child relationships associated with devices on the mesh network, a neighbor list defining each neighbor associated with devices on the mesh network, or path stability between devices on the mesh network.

9. The computer-implemented diagnostic tool of claim 8, wherein the network manager resides on a gateway device connected to one of the wireless mesh networks.

10. The computer-implemented diagnostic tool of claim 7, wherein the organization data is displayed graphically in the form of lines or arrows identifying relationships between devices on the mesh network.

11. The computer-implemented diagnostic tool of claim 7, wherein the diagnostic tool is implemented by a general purpose machine programmed to execute instructions for implementing the plot plan module, the device module, and the organization module.

12. A computer-implemented design tool for validating a wireless mesh network layout, the design tool stored on a non-transitory computer-readable medium executed by a processor to implement modules of the design tool, the design tool comprising:
a plot plan module that receives as input an image representing the physical space occupied by the wireless mesh network and displays the image to a user;
a scale module that receives input from a user representing a scale associated with the physical space defined by the received image, wherein the scale is associated with the physical space defined by the plot plan module;
a device module that displays one or more device types available for placement onto the physical space defined by the plot plan module, wherein the placement of devices onto the physical space defines a layout of the wireless mesh network to be validated;
a planning parameter module that defines one or more planning parameters, each planning parameter defining a requirement that must be met by the wireless mesh network layout; and
a validation module that determines based on the scale associated with the physical space, a density level assigned to one or more regions in the physical space, and the placement of devices onto the physical space, whether the wireless mesh network layout complies with each of the planning parameters, wherein the validation module provides a visual output indicating whether the layout complies with the planning parameters.

13. A computer-implemented design tool of claim 12, further including:
a density module that receives input from a user associating density levels with the physical space defined by the received image, wherein the validation module further determines based on the density levels associated with the physical space whether the wireless mesh network layout complies with the planning parameters.

14. The computer-implemented design tool of claim 12, wherein the scale module includes:
a scale line provided with respect to the received image, the scale line having a location and length that can be modified by the user; and a scale prompt module that prompts the user for a distance value represented by the scale line, wherein the scale module assigns a scale to the received image based on the selected length of the line and the distance value associated with the line.

15. The computer-implemented design tool of claim 12, wherein the planning parameter module includes at least one of the plurality of parameter values selected from the group consisting of: communication range associated with each density level, number devices required to be within communication range of each device of a first type, number of devices required to be within communication range of each device of a second type, percentage of devices required to be within communication range of a gateway device, and whether each device is capable of reaching the gateway device.

16. The computer-implemented design tool of claim 12, wherein the device module, in response to the user placing a device from the device module onto the physical space, prompts the user for input regarding identification of the device and a height associated with the device.

17. The computer-implemented design tool of claim 12, wherein the visual output provided by the validation module indicating that the layout does not comply with the planning parameters highlights each device failing to satisfy one or more of the planning parameters by displaying a circle indicating the communication range of the device and displaying the planning parameter that the device failed to satisfy.

18. The computer-implemented design tool of claim 12, wherein the design tool is implemented by a general purpose machine programmed to execute instructions for implementing the plot plan module, the scale module, the device module, the planning parameter module, and the validation module.

\* \* \* \* \*

UNITED STATES PATENT AND TRADEMARK OFFICE
CERTIFICATE OF CORRECTION

PATENT NO. : 8,364,742 B2  Page 1 of 1
APPLICATION NO. : 12/394399
DATED : January 29, 2013
INVENTOR(S) : Joseph Citrano, III It is certified that error appears in the above-identified patent and that said Letters Patent is hereby corrected as shown below:

Title Page, item 73 Assignee
Delete "Rosemount Inc., Eden Prairie, MN"
Insert --Fisher-Rosemount Systems, Inc., Austin, TX--

Signed and Sealed this
Thirty-first Day of December, 2013

Margaret A. Focarino
*Commissioner for Patents of the United States Patent and Trademark Office*